(12) United States Patent
Lin et al.

(10) Patent No.: US 6,646,029 B1
(45) Date of Patent: Nov. 11, 2003

(54) PYRIMIDINE DERIVATIVES AS HARDNESS STABILIZERS

(75) Inventors: Horng-Jau Lin, Wadsworth, OH (US); Rabindra Nath Datta, Schalkhaar (NL); Otto William Maender, Copley, OH (US)

(73) Assignee: Flexsys America L.P., Akron, OH (US)

(*) Notice: Subject to any disclaimer, the term of this patent is extended or adjusted under 35 U.S.C. 154(b) by 0 days.

(21) Appl. No.: 09/814,342

(22) Filed: Mar. 21, 2001

Related U.S. Application Data

(60) Provisional application No. 60/191,054, filed on Mar. 21, 2000.

(51) Int. Cl.[7] .................................................. C08J 5/45
(52) U.S. Cl. ........................ 524/83; 524/86; 524/87; 524/100; 528/373; 528/374; 528/390
(58) Field of Search ..................... 524/83, 86, 87, 524/100; 525/333.3, 333.9, 331.9; 528/373, 374, 390

(56) References Cited

U.S. PATENT DOCUMENTS

| | | | | |
|---|---|---|---|---|
| 3,565,894 A | * | 2/1971 | D'Amico | 540/601 |
| 3,574,213 A | * | 4/1971 | D'Amico | 544/237 |
| 3,726,866 A | * | 4/1973 | D'Amico | 540/603 |
| 3,839,303 A | | 10/1974 | D'Amico | 260/79.5 B |
| 4,085,093 A | * | 4/1978 | Hopper | 524/168 |
| 4,482,663 A | | 11/1984 | Kraus | 524/99 |
| 4,946,956 A | * | 8/1990 | Wheeler et al. | 544/323 |
| 5,068,271 A | * | 11/1991 | Wheeler et al. | 524/100 |
| 5,889,123 A | | 3/1999 | Schubart et al. | 525/330.7 |
| 6,465,604 B2 | * | 10/2002 | Lin et al. | 528/373 |

FOREIGN PATENT DOCUMENTS

| | | | |
|---|---|---|---|
| EP | 0 267 675 | 5/1988 | C08C/19/00 |
| WO | WO 01/16226 | 3/2001 | C08K/5/378 |

OTHER PUBLICATIONS

G.F. Kozhemyachko et al.: "2–mercapto–4–methylpyrimidine hydrochloride as an accelerator for sulphur curing of unsaturated rubbers in production mixes", International Polymer Science and Technology, vol. 2, No. 11, 1975, pp. T/64–T/65, XP002179086, Rapra Technologies, Shropshire., GB ISSN: 0307–174X, Examples 2, 6, 8; Table 1 Month Unknown.

Chemical Abstract for, 84:136916v, Study of kinetics of sulfur vulcanization of rubbers in the presence of 2–mercapto–4, 6–dimethyl=pyrimidine. G.F. Kozhemyachko, et al. Date Unknown.

Chemical Abstract for, 84:6217g, Pyrimidine class compounds as accelerators of sulfur vulcanizaton of rubbers. G.F. Kozhemyachko, et al. Date Unknown.

Chemical Abstract for, 86:172770t, Study of mercaptopyrimidines as accelerators of the sulfur vulcanization of unsaturated rubbers. G.F. Kozhemyachko, et al. Date Unknown.

Chemical Abstract for, 91:124662r, Pyrimidine series compounds as accelerators of the sulfur vulcanization of rubbers. Koorchemkin S.N., et al. Date Unknown.

Chemical Abstract for, 101:8513u, Study of feasibility of replacing sulfenamide accelerators with bis (4–methylpyrimidin–2–yl) disulfide in tread rubber formulation. Komissarivam A Yu., et al Date Unknown.

Chemical Abstract for, 90:88521n, Vulcanzation of SRI–3 rubber in the presence of bis (4–methylpyrimidin–2–yl) disulfide. Korchemkinm S.N., et al. Date Unknown.

Rubber Chem Techn 1996, vol. 69, Novel Sulfur Vulcanization Accelerators Based on Mercapto–Pyridine, –Pyrazine, And –Pyrimidine. Charles J. Rostek, et al. pp. 180–202 Month Unknown.

Rubber Chemistry and Technology, 1987, vol. 60, New Curing System Components L.H. Davis, et al. pp. 124–139 Date Unknown.

Rubber Technology Handbook, 1989, Dr. Werner Hofmann, pp. Preface; 230–233, Month Unknown.

Abstract for Japanese Patent No.: 141,944 Date Unknown.
Abstract for Japanese Patent No.: 239,305 Date Unknown.
Abstract for Soviet Union Patent No.: 441,891 Date Unknown.
Abstract for Soviet Union Patent No.: 873,328 Date Unknown.
Abstract for Soviet Union Patent No.: 366,486 Date Unknown.

* cited by examiner

*Primary Examiner*—Margaret Medley
(74) *Attorney, Agent, or Firm*—Richard P. Fennelly; Louis A. Morris

(57) ABSTRACT

A vulcanizable composition comprising a sulfur vulcanizable rubber, a sulfur vulcanizing agent, an accelerating agent selected from the group consisting of non-thiazole sulfenamide accelerators in an amount effective to not substantially inhibit vulcanization and an amount effective to improve the hardness stabilization of said rubber upon vulcanization of a hardness stabilization agent comprising a pyrimidine derivative. A method of improving the hardness stabilization of a composition comprising a sulfur vulcanizable rubber by adding to said composition the accelerators and pyrimidine derivative.

24 Claims, No Drawings

PYRIMIDINE DERIVATIVES AS HARDNESS STABILIZERS

CROSS REFERENCE TO RELATED APPLICATION

This application claims priority from Provisional Patent Application No. 60/191,054, filed Mar. 21, 2000.

BACKGROUND OF THE INVENTION

1. Field of the Invention

The invention relates to a pyrimidine derivative for use in the hardness stabilization of rubber-compounds and a method of improving the hardness stabilization of rubber by adding the pyrimidine derivative and associated accelerators to an unvulcanized rubber composition.

2. Discussion of the Prior Art

Vulcanizing rubber compositions by heating a sulfur-vulcanizable rubber composition with sulfur and/or a sulfur donor and a vulcanization accelerator has been known for many years. By this process vulcanizates having acceptable physical properties including tensile strength, resilience, and fatigue resistance can be obtained, but such vulcanizates tend not to have good aging properties. A typical aging phenomenon is hardening, which is explained below.

Uncured as well as cured rubbers are prone to aging effects. The unsaturated groups in diene rubbers, e.g. styrene-butadiene rubber (SBR) or a blend of SBR with natural rubber, butadiene rubber or with both, make it possible to cure with sulfur, but at the same time they exhibit a sensitivity toward oxygen, ozone, and other reactive substances causing changes such as hardening of the vulcanizate. Unaged diene rubbers contain free double bonds that remain sensitive to the above reactive substances even after vulcanization. Higher temperatures make these effects even more noticeable. Also, since unreacted double bonds are present in the rubber vulcanizate, there is the possibility of further reaction with sulfur causing hardening, i.e. additional crosslinking, of the vulcanizate.

The use of antioxidants will retard the oxygen-induced aging of the vulcanizate, but will not affect the increase in hardness due to sulfur-induced crosslinking.

L. H. Davis et al. in *Rubber Chemistry and Technology*, Vol. 60, 1987, 125–139, disclose the use of 2,2'-dithiobispyridine-N-oxide and the zinc salt of pyridine-2-thiol-N-oxide as a primary accelerator alone or in combination with a low amount of a benzothiazole-2-sulfenamide accelerator in the sulfur vulcanization of polyisoprene, e.g., natural, rubber compounds.

U.S. Pat. No. 3,574,213 discloses rubber vulcanization accelerators comprising pyrimidinylthio-phthalazines, particularly 1-(4,6-dimethyl-2-pyrimidinylthio)-phthalazine, that achieve reduction in scorch.

C. J. Rostek et al, in *Rubber Chemistry and Technology*, Vol. 69, 1996, 180–202, disclose the use of novel sulfur vulcanization accelerators based on mercapto-pyridine, -pyrazine, and -pyrimidine. This reference relates to polyisoprene rubbers, which do not harden.

U.S. Pat. No. 3,839,303 discloses the inhibition of premature vulcanization of natural or synthetic diene rubbers by including in the vulcanizable composition accelerating agents, such as thiazole accelerators and a compound comprising certain pyrimidinesulfenamides, such as N-cyclohexyl-4,6-dimethyl-2-pyrimidinesulfenamide. The compound of this reference is formulated so as to be effective in inhibiting premature vulcanization in the vulcanizable composition to which it is added.

SUMMARY OF THE INVENTION

In one embodiment, the present invention comprises a vulcanizable composition comprising a sulfur vulcanizable rubber, a sulfur vulcanizing agent, an accelerating agent selected from the group consisting of sulfenamide accelerators, other than thiazole sulfenamides, and a hardness stabilization agent comprising a pyrimidine derivative of the formula:

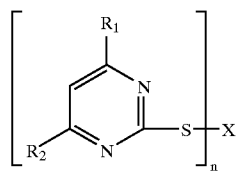

Where X=H, $R_1$ through $R_4$, $NR_3R_4$, $OR_5$, $SR_5$, $SO_2R_6$, M, $(SO_3)$,M (M=metal ion), and n and z can be the same or different and 1, 2 or 3, depending on whether the respective valence of X and M is 1, 2 or 3, $R_1$ through $R_4$ are the same or different and selected from the group consisting of the substituents H, halogen, OH, $NH_2$, alkyl, cycloalkyl, aryl, alkylaryl, aralkyl, with the substituents alkyl, cycloalkyl, aryl, alkylaryl and aralkyl optionally having additional functional groups selected from the group consisting of $NH_2$, OH, substituted amino, substituted hydroxyl, halogen, and carbonyl containing group, when $R_3$ and/or $R_4$ are one of the substituents alkyl, cycloalkyl, aryl, alkylaryl and aralkyl, they may be in the same constituent in a ring together with N to form a heterocyclic group, $R_5$ is selected from the group consisting of the substituents H, alkyl, cycloalkyl, aryl, alkylaryl and aralkyl, or a radical derived from a carbon based heterocyclic group containing at least one of S or N, or both S and N, $R_6$ is selected from the group consisting of the substituents alkyl, cycloalkyl, aryl, alkylaryl, aralkyl, H, OH, OM, $NH_2$, $NR_3R_4$, and $OR_5$, the amount of accelerating agent in said composition being greater than about 0.6 phr when said rubber is SBR and at least about 0.5 phr when said rubber is natural rubber, and the amount of hardness stabilization agent being at least about 0.5 phr.

In a second embodiment, the present invention comprises a method of improving the hardness stabilization of rubber which includes adding the above composition to an unvulcanized rubber composition followed by vulcanization of the rubber composition.

Other embodiments of the invention encompass specific pyrimidine derivatives, accelerators, details about relative amounts of reactants, and unvulcanized rubber compositions, all of which are hereinafter disclosed in the following discussion of each of the facets of the present invention.

DETAILED DISCRIPTION OF THE INVENTION

According to the present invention, it has been found that by adding appropriate amounts of certain pyrimidine derivatives and non-thiazole sulfenamide accelerators to a vulcanizable rubber composition comprising natural rubber or other rubbers, vulcanizates, from which, e.g., pneumatic tires can be made, having improved properties can be obtained. These combinations of accelerators and pyrimidine derivatives have the effect of stabilizing the hardness properties of the rubber vulcanizate, e.g., during the service life of a pneumatic fire, without inhibiting or slowing vulcanization, i.e. increasing "scorch" time, in the production of the tire. Thus, hardness stabilization is achieved without slowing of the vulcanization process, thereby avoiding loss in production efficiency.

In this application, the abbreviation "phr", means the number of parts by weight per 100 parts by weight of rubber. In the case of a rubber blend, it is based on 100 parts by weight of total rubber.

Either natural rubber (NR), styrene-butadiene rubber (SBR) or a blend of NR and SBR or NR and SBR with one or more other rubbers can be used in the invention process, it being understood that for purposes of this invention the term "rubber" means; an elastomer containing a hydrocarbon unit which is a polymer with some unsaturated chemical bonds. Typically, SBR, a blend of SBR with natural rubber (NR), a blend of SBR with polybutadiene rubber or butadiene rubber (BR), or a blend of SBR with NR and BR is used. The type of rubber or mixture of rubbers will have some affect on the precise amounts of accelerator and pyrimidine derivative appropriate to achieve hardness stabilization without inhibition of the vulcanization.

Typically, the amount of pyrimidine derivative hardness stabilizing agent employed in the process of the present invention will be at least about 0.5 phr. The preferred upper limit is about 10.0 phr, most preferably 3.0 phr.

In the process of the present invention sulfur and/or a sulfur vulcanizing agent is employed. The amount of sulfur to be compounded with the rubber usually is 0.1 to 10 phr, preferably in excess of about 1 phr. If a sulfur donor is used the amount thereof should be calculated in terms of the amount of sulfur.

Typical examples of sulfur donors that can be used in the process of the present invention include dithiodimorpholine, caprolactam disulfide, tetramethylthiuram disulfide, and dipentamethylenethiuram tetrasulfide. The reader is referred to W. Hofmann, *Rubber Technology Handbook*, Hanser Publishers, Munich 1989, in particular pages 231–233.

Particularly preferred pyrimidine derivatives for use in the composition and method of the present invention have the following chemical structural formulas:

2-Benzothiazoyl-4,6-dimethyl-2-pyrimidyl disulfide

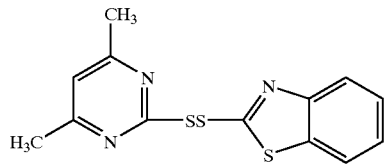

N-Cyclohexyl 4,6-dimethyl-2-pyrimidinesulfenamide

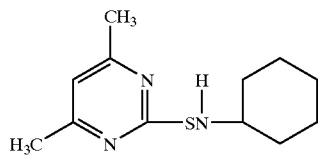

S-(4,6-Dimethyl-2-pyrimidyl) p-toluenethiosulfonate

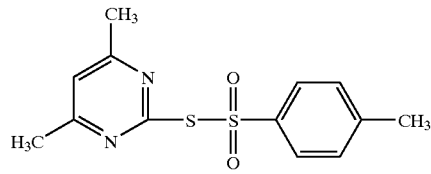

It is preferred that the alkyl, cycloalkyl, aryl, alkyl aryl and aralkyl groups of the above formula I have from 2 to about 15 carbon atoms and most preferably 2 to about 8 carbon atoms.

Preferred radicals derived from a heterocyclic group for $R_5$ of formula I are 2-benzothiazoyl and a pyrimidine.

A further preferred pyrimidine derivative of formula I for use in the composition and method of the present invention is 2,2' bis 4,6-dimethylpyrimidyl disulfide.

The preferred metal that may be in the compound of formula I is selected from the group consisting of Zn, Ni, Mg, Co and Na.

The preferred carbonyl containing groups of formula I include carboxylic acid or its salt, ester, amide, ketone or aldehyde.

Typical vulcanization non-thiazole sulfenamide accelerating agents (accelerators) appropriate for use in the invention include benzothiazole-based accelerators, particularly mercaptobenzothiazoles, thiophosphoric acid derivatives, thiurams, dithiocarbamates, diphenylguanidine (DPG), di-o-tolyl guanidine, xanthates, and mixtures of one or more of these accelerators. Preferably, the vulcanization accelerator comprises mercaptobenzothiazoles, most preferably 2-mercaptobenzothiazole (MBT). A particularly preferred accelerating agent is bis(dibenzylthiocarbamoyl)disulfide.

Particularly effective sulfur-vulcanizable rubber compositions in accordance with the present invention include a composition comprising styrene-butadiene rubber, 2-pyrimidinesulfenamide, and a mixture of the accelerators, bis(dibenzylthiocarbamoyl) disulfide and 2-mercaptobenzothiazole, or a composition comprising natural rubber, 2-pyrimidinesulfenamide and the accelerator, 2-mercaptobenzothiazole.

We have found that with SBR, the amount of accelerator should be greater than about 0.6 phr of accelerator, and for natural rubber at least about 0.5 phr of accelerator, with upper limits in either case preferably about 10.0 phr and most preferably about 3.0. Natural rubber has more reactive allylic sites for crosslinking than SBR and generally requires less accelerator for efficient crosslinking.

It may be effective, in lieu of directly providing a pyrimidine derivative of formula I in the composition of the invention, to provide precursors of such derivatives. It is particularly preferred to use thiazole derivatives and 2-mercaptopyrimidines that lead to the formation of such derivatives, in situ. A derivative for which in situ formation is particularly useful is 2-benzothiazoyl-4,6dimethyl-2-pyrimidyl disulfide.

Conventional rubber additives may also be included in the sulfur-vulcanizable rubber composition in accordance with the present invention. Examples include reinforcing agents such as carbon black, silica, clay, whiting and other mineral fillers, processing oils, tackifiers, waxes, phenolic antioxidants, phenylenediamine antidegradants, antiozonants, pigments, e.g. titanium dioxide, resins, plasticizers, factices, and vulcanization activators, such as stearic acid and zinc oxide. These conventional rubber additives may be added in amounts known to the person skilled in the art of rubber compounding. The reader is also referred to the examples that are described below.

For further details on these typical rubber additives and vulcanization inhibitors, see W. Hofmann, *Rubber Technology Handbook*, Hanser Publishers, Munich 1989.

Finally, in specific applications it may also be desirable to include steel-cord adhesion promoters such as cobalt salts and dithiosulfates in conventional, known quantities.

The sulfur vulcanization process of the present invention can be carried out using means and equipment that are well known to a person skilled in the art. Suitable vulcanization procedures are described in W. Hofmann, *Rubber Technology Handbook*, Hanser Publishers, Munich 1989.

A typical method comprises preparing a masterbatch consisting of rubber, carbon black, a vulcanization activator, and a processing oil, in an internal mixer such as a Banbury mixer or a Wemer & Pfleiderer mixer, and subsequently adding a vulcanization system comprising sulfur and a vulcanization accelerator, and the hardness stabilizing pyrimidine derivative in accordance with the present invention to the masterbatch either in a low temperature mixer or on a two-roll mill, i.e. the productive stage of mixing. The uncured rubber composition is then vulcanized by heating, e.g., in a compression mold.

The invention vulcanization process typically is carried out at a temperature of 110–200, preferably 120–190, more preferably 140–180° C. for a period of time of up to 12, preferably up to 6, more preferably up to 1 hour.

The composition of the present invention is useful in the. manufacture of many articles, including pneumatic tires, e.g., for passenger cars and trucks, and industrial rubber goods, which comprise the rubber vulcanizate obtained by the method of the invention.

The invention is illustrated by the following examples.

EXAMPLES

Example 1

This example illustrates the syntheses of two particularly preferred pyrimidine derivatives of the present invention, 2-benzothiazolyl4,6-dimethyl-2-pyrimidyl disulfide and S-(4,6-dimethyl-2-pyrimidyl) p-toluenethiosulfonate.

The synthesis of a third particularly preferred pyrimidine derivative, of N-cyclohexyl-4,6-dimethyl-2-pyrimidinesulfenamide, may be found in existing literature.

To synthesize 2-benzothiazolyl 4,6-dimethyl-2-pyrimidyl disulfide, a mixture of 4,6-dimethyl-2-mercaptopyrimidine (2.8 g), 2-(4-morpholinothio)benzothiazole (5.0 g) and trifluoroacetic acid (2.3 g) in tetrahydrofuran (100 ml) was stirred at room temperature for ten minutes and stood over night. The mixture was evaporated under reduced pressure to give a residue which was purified by column chromatography using silica gel and a mixed solvent of ethyl acetate and hexanes to yield 2.4 g (40%) of the product: mp 85–86 C.

To synthesize S-(4,6-dimethyl-2-pyrimidyl) p-toluenethiosulfonate, a mixture was prepared from N,N-dicyclohexyl-4,6-dimethyl-2-pyrimidinesulfenamide (1.6 g), sodium p-toluenesulfinate (1.8 g) and temperature for 30 minutes and filtered. The filtered solid was dried to give 0.48 g (33%) of the product: mp 114–6 C.

Example 2

A masterbatch of rubber, carbon black, stearic acid, zinc oxide, processing oil, and antidegradant was made in an internal mixer. The sulfur, accelerators, and hardness stabilizers were mixed on a, two-roll mill at approx. 50–70° C. Rubber compounds were vulcanized by compression molding at 145° C. for a period of time equal to $1.7 \times t_{90}$. After cooling the vulcanized rubber sheets for 24 h, test pieces were cut and analyzed.

The Theological properties were determined on a Monsanto Rheometer MDR2000E, arc 0.5°, 145° C./60 min. Scorch time ($t_{s2}$) and (t5) are the times to increase the torque 2 dNm and 5 Mu, respectively, above the minimum torque ($M_L$). Optimum vulcanization time ($t_{90}$) is the time at 90% of the maximum torque ($M_H$). Tend is the time at the rheometer and is set at 1 h. Delta torque (Delta S) is the difference between the minimum and the maximum torque. The slope of a rheogram between $M_L$ and $M_H$ is a measure of the cure rate (RH). Hysteresis is the percentage of energy lost per cycle of deformation. The ratio of loss modulus to storage modulus is defined as mechanical loss and this corresponds to tangent delta (tan d).

The rubber test pieces were aged in a hot air circulation oven for 3 days (72 h) at 100° C. to simulate hardening during use, for example, as a tire.

The hardness stabilization characteristics were determined by calculating the so-called modulus stabilization (MS).

The modulus stabilization is the ratio of the modulus at elongation 200% (Mod200) of the aged and the unaged rubber test pieces and is expressed as a percentage by multiplying this ratio by 100%. The lower the ratio $Mod200_{aged}/Mod200_{unaged}$, the better the modulus retention or hardness stabilization. The Mod200 was obtained from tensile stress-strain tests which were performed in accordance with ISO 37-1994 (dumb-bell type 2).

The masterbatch employed in the compositions was compounded as shown in Table 1. The various Stocks comprised the compositions as shown in Table 2. The rheological properties and modulus stabilization (an indication of the hardness stabilizing effect of a pyrimidine derivative) is shown in Table 3.

TABLE 1

| Masterbatch | |
| --- | --- |
| | phr |
| SBR | 137.5 |
| N-220[1] | 60.0 |
| 6PPD[2] | 1.0 |
| Stearic acid | 2.0 |
| Zinc oxide | 3.0 |
| Total | 203.5 |

[1]Carbon black
[2]N-1,3-Dimethylbutyl-N'-phenyl-p-phenylenediamine

TABLE 2

| | Stock Compositions | | | | | | | |
| --- | --- | --- | --- | --- | --- | --- | --- | --- |
| Stock # | 1 | 2 | 3 | 4 | 5 | 6 | 7 | 8 |
| Masterbatch | 203.5 | 203.5 | 203.5 | 203.5 | 203.5 | 203.5 | 203.5 | 203.5 |
| HS | | | | | | | | |
| Sulfur | 1.8 | 1.8 | 1.8 | 1.8 | 1.8 | 1.8 | 1.8 | 1.8 |
| DPG[3] | 0.3 | 0.3 | 0.3 | 0.3 | 0.3 | 0.3 | 0.3 | 0.3 |
| TBBS[4] | 0.8 | 1.0 | 1.0 | 1.2 | | | 0.5 | 0.5 |
| MBTS[5] | 0.2 | 0.2 | 0.2 | | | | | |
| CDMPS[6] | | 1.0 | 0.5 | 0.5 | 1.0 | 1.0 | 1.0 | 1.0 |
| MBT[7] | | | | | 0.5 | 0.3 | 0.5 | 0.3 |

[3]N,N-Diphenylguanidine
[4]N-t-Butyl-2benzothiazolesulfenamide
[5]2,2'-Dithiobis(benzothiazole)
[6]N-Cyclohexyl-4,6-dimethyl-2pyrimidinesulfenamide
[7]2-Mercaptobenzothiazole

TABLE 3

Rheological properties at 145° C./60 min and
Modulus Stabilization (refer to Table 2 for Stock compositions)

| Stock No. | 1 | 2 | 3 | 4 | 5 | 6 | 7 | 8 |
|---|---|---|---|---|---|---|---|---|
| Scorch Test | | | | | | | | |
| t5 @ 135° C. (min) | 13.90 | 21.60 | 18.01 | 23.09 | 16.71 | 21.09 | 14.94 | 19.55 |
| t35 @ 135° C. (min) | 19.76 | 29.00 | 24.83 | 31.02 | 20.69 | 26.08 | 19.57 | 25.19 |
| Min, Visc. (mu) | 36.69 | 36.05 | 36.55 | 36.61 | 36.45 | 36.55 | 35.66 | 35.96 |
| Rheometer @ 145° C. | | | | | | | | |
| Rmax (dNM) | 13.99 | 15.04 | 14.87 | 15.02 | 13.75 | 13.21 | 14.92 | 14.57 |
| Rmin (dNm) | 2.21 | 2.18 | 2.18 | 2.23 | 2.24 | 2.22 | 2.23 | 2.25 |
| Rmax–Rmin (dNM) | 36.69 | 36.05 | 36.55 | 36.61 | 36.45 | 36.55 | 35.66 | 35.96 |
| t2 (min) | 10.44 | 15.18 | 13.16 | 16.17 | 10.86 | 13.64 | 10.22 | 13.04 |
| t25 (min) | 11.38 | 16.49 | 14.34 | 17.56 | 11.62 | 14.53 | 11.07 | 13.28 |
| t90 (min) | 26.66 | 28.88 | 25.51 | 29.59 | 26.85 | 32.74 | 23.29 | 27.40 |
| Peak Rate (dNM/m) | 1.20 | 1.80 | 1.70 | 1.60 | 1.60 | 1.10 | 1.90 | 1.60 |
| Stress-Strain Data | | | | | | | | |
| A. Unaged | | | | | | | | |
| 1. Tensile (Mpa): | | | | | | | | |
| Modulus, 100% | 1.63 | 1.91 | 1.88 | 1.96 | 1.60 | 1.58 | 1.87 | 1.79 |
| Modulus, 200% | 4.55 | 5.41 | 5.33 | 5.76 | 4.57 | 4.31 | 5.32 | 5.01 |
| Modulus, 300% | 9.27 | 10.54 | 10.40 | 11.04 | 9.10 | 8.71 | 10.27 | 9.79 |
| Ultimate Tensile | 26.73 | 25.94 | 26.23 | 26.24 | 19.59 | 21.36 | 20.25 | 22.59 |
| 2. Elongation (%): | | | | | | | | |
| Ultimate Elongation | 631 | 564 | 582 | 570 | 512 | 550 | 485 | 542 |
| B. Aged | | | | | | | | |
| - - - 24 hrs - - - | | | | | | | | |
| 1. Tensile (Mpa): | | | | | | | | |
| Modulus, 100% | 2.39 | 2.47 | 2.55 | 2.53 | 2.17 | 2.09 | 2.53 | 2.35 |
| Modulus, 200% | 6.80 | 7.15 | 7.44 | 7.43 | 6.37 | 5.86 | 7.38 | 6.87 |
| Modulus, 300% | 12.33 | 13.01 | 13.30 | 13.29 | 11.78 | 11.00 | 13.07 | 12.41 |
| Ultimate Tensile | 24.91 | 22.07 | 23.67 | 22.78 | 17.08 | 19.68 | 19.37 | 17.97 |
| 2. Elongation (%): | | | | | | | | |
| Ultimate Elongation | 524 | 453 | 471 | 465 | 400 | 460 | 415 | 400 |
| - - - 72 hrs - - - | | | | | | | | |
| 1. Tensile (Mpa): | | | | | | | | |
| Modulus, 100% | 2.77 | 2.85 | 2.89 | 2.98 | 2.51 | 2.53 | 3.04 | 2.70 |
| Modulus, 200% | 7.81 | 8.13 | 8.20 | 8.42 | 7.15 | 7.05 | 6.69 | 7.68 |
| Modulus, 300% | 13.48 | 14.07 | 14.19 | 14.37 | 12.50 | 12.34 | 14.53 | 13.32 |
| Ultimate Tensile | 21.99 | 19.84 | 21.22 | 21.69 | 15.48 | 17.25 | 16.68 | 17.95 |
| 2. Elongation (%): | | | | | | | | |
| Ultimate Elongation | 460 | 400 | 421 | 425 | 357 | 398 | 350 | 389 |
| Modulus Stability (MS) (based on 200% Modulus) | | | | | | | | |
| MS24*, % | 149 | 132 | 140 | 129 | 139 | 136 | 139 | 137 |
| MS72*, % | 172 | 150 | 154 | 146 | 156 | 164 | 163 | 153 |

*MS24 and MS72 represent MS at 24 and 72 hours of aging, respectively.

With reference to Table 2, the Stock having a composition in accordance with the present invention is Stock #5. This stock contains non-thiazole sulfenamide accelerators in an amount effective to accelerate vulcanization and sufficient to not substantially inhibit vulcanization, and an amount of a pyrimidine derivative of formula I, as defined above, effective to improve the hardness stabilization of the rubber upon vulcanization, all of which is shown in Table 3. The total amount of such accelerators is 0.8 phr (0.3 phr DPG and 0.5 phr MBT) and the amount of pyrimidine derivative (CDMPS) is 1.0 phr.

The control shown in Table 2 is Stock #1, which is a composition containing thiazolesulfenamide accelerator (TBBS) and MBTS, and no hardness stabilizer.

The data in Table 3, shows Stock #5 achieving no significant inhibition of vulcanization (see Rmax, t2, t25 and t90) as compared to the control, and also enhanced hardness stabilization (see Modulus Stability MS24 and MS72). This may be contrasted with all other Stocks when compared to Stock #1, since no other Stock achieves no significant inhibition of vulcanization and enhanced hardness stabilization. The Stock closest to Stock #5 is Stock #6, since Stock #6 comprises an amount of a pyrimidine derivative of formula I and a non-thiazolesulfenamide accelerator, but the latter not in an amount effective to accelerate vulcanization, nor substantially inhibit vulcanization.

Stock #2 employs a pyrimidine derivative hardness stabilizer, but unlike as required by the present invention, does not employ non-thiazole sulfenamide accelerators. To the contrary, a thiazolesulfenamide (TBBS) accelerator is employed with MBTS. As shown in Table 3, there is considerable inhibition of vulcanization for this Stock.

Example 3

Two compounds were formulated and tested for this example, Stock #1 and Stock #2, the composition of which are summarized in Table 4. The rheological properties (Cure data) are shown in Table 5 and modulus stabilization (Stress-strain properties) are shown in Table 6. The primary difference between the compositions of this example and Example 1, is that this example employed natural rubber (NR).

TABLE 4

Stock compositions

| Stock# | 1 | 2 |
|---|---|---|
| NR | 100.00 | 100.00 |
| Carbon black | 50.00 | 50.00 |
| ZnO | 5.00 | 5.00 |
| Stearic acid | 2.00 | 2.00 |
| 6PPD* | 1.00 | 1.00 |
| CDMPS* | — | 1.50 |
| MBT* | — | 1.50 |
| CBS[9] | 1.50 | — |
| Sulfur | 3.00 | 3.00 |

*See footnote 2, 7 and 8 for abbreviation of 6PPD, CDMPS and MBT, respectively.
[9]N-Cyclohexyl-2-benzothiazolesulfenamide

TABLE 5

Rheological properties at 145° C.

| Stock# | 1 | 2 |
|---|---|---|
| Delta S, Nm | 2.75 | 2.68 |
| ML, Nm | 0.26 | 0.26 |
| Ts2, min | 4.27 | 2.60 |
| T90, min | 10.15 | 7.40 |
| Cure rate, Nm/min | 0.10 | 0.11 |
| Tangent delta, t90 | 0.075 | 0.087 |
| Tangent delta, 60' | 0.068 | 0.075 |

TABLE 6

Stress-strain properties (Cured @ 150° C./t90)

| Stock # | 1 | 2 |
|---|---|---|
| A. Unaged | | |
| Tensile (Mpa) | 27.30 | 28.70 |
| Modulus, 100% | 4.78 | 4.49 |
| Modulus, 200% | 11.90 | 11.10 |
| Elongation (%) | 407 | 451 |
| B. Aged (48 hrs at 100° C.) | | |
| Tensile (Mpa) | 16.10 | 22.80 |
| Modulus, 100% | 8.28 | 7.03 |
| Modulus, 200% | — | 16.4 |
| Elongation (%) | 172 | 275 |

TABLE 6-continued

Stress-strain properties (Cured @ 150° C./t90)

| Stock # | 1 | 2 |
|---|---|---|
| C. Modulus stability (MS) based on 100% modulus | | |
| MS % | 173 | 157 |

It is clear from the data that the present invention is also effective with natural rubber. Stock #2 comprised the composition of the present invention in that it contained a non-thiazolesulfenamide accelerator (MBT) in an amount effective to accelerate vulcanization and sufficient to not substantially inhibit vulcanization, shown in Table 5, and an amount of a pyrimidine derivative of formula I (CDMPS) effective to improve the hardness stabilization of the rubber upon vulcanization, shown in Table 6. Stock #1 was outside the present invention in that it contained no pyrimidine derivative of formula I and it also contained a thiazolesulfenamide accelerator (CBS).

Tables 5 and 6 show the properties of Stock #2 to be consistent with the requirements of the present invention, as compared to Stock #1, i.e. no inhibition of vulcanization and enhanced hardness stabilization.

Example 4

Two compounds were formulated and tested for this example, Stock #1 and Stock #2, the composition of which are summarized in Table 7. The Theological properties (Cure data) and modulus stabilization (Stress-strain properties) are shown in Table 8. This example compares the properties of Stock #2 which is a composition in accordance with the present invention, and which contains bis (dibenzylthiocarbamoyl) disulfide (TBzTD) as an accelerating agent.

TABLE 7

Stock Compositions

| Stock # | 1 | 2 |
|---|---|---|
| Masterbatch HS | 203.5 | 203.5 |
| Sulfur | 1.8 | 1.8 |
| DPG | 0.3 | 0.3 |
| TBBS | 0.8 | 0 |
| MBTS | 0.2 | 0 |
| TBzTD[9] | 0 | 0.20 |
| CDMPS | 0 | 3.0 |
| MBT | 0 | 0.5 |

[9]Bis(dibenzylthiocarbamoyl) disulfide

TABLE 8

Cure data at 145° C.

| Properties | Stock #1 | Stock #2 |
|---|---|---|
| Delta S, Nm | 0.95 | 1.16 |
| ML, Nm | 0.16 | O0.15 |
| Ts2, Min | 9.1 | 7.0 |
| T90, min | 25.9 | 20.3 |
| Cure rate, t90 ts2 | 16.7 | 13.3 |

TABLE 8-continued

Cure data at 145° C.

| | Stock #1 | Stock #2 |
|---|---|---|
| Unaged | | |
| M 100, $MP_a$ | 1.4 | 1.8 |
| M 200, $MP_a$ | 3.0 | 4.4 |
| M 300, $MP_a$ | 5.7 | 8.2 |
| TS, $MP_a$ | 20.9 | 21.6 |
| Elongation, % | 720 | 590 |
| Aged, 2 d/100° C. | | |
| M 100, $MP_a$ | 2.8 | 2.6 |
| M 200, $MP_a$ | 7.0 | 6.4 |
| M 300, $MP_a$ | 11.7 | 10.8 |
| TS, $MP_a$ | 20.1 | 20.1 |
| Elongation, % | 465 | 490 |
| MS, % (based on M 200) | 233 | 145 |
| Unaged | | |
| Fatigue to Failure, Kc | 88 | 128 |
| Tear strength, kN/m | 38 | 43 |
| Abrasion loss, % | 11 | 10 |
| Aged, 2d/100° C. | | |
| Fatigue to Failure, Kc | 29 | 35 |
| Tear strength, kN/m | 35 | 43 |
| Viscoelastic Properties (Cure: 145° C./30') | | |
| Unaged | | |
| Storage modulus, E', $MP_a$ | 6.18 | |
| Loss modulus, E", $MP_a$ | 1.63 | 1.65 |
| Tangent delta | 0.263 | 0.261 |
| Aged, 2d/100° C. | | |
| Storage modulus, E', $MP_a$ | 7.69 | 7.49 |
| Loss modulus, E", $MP_a$ | 1.78 | 1.77 |
| Tangent delta | 0.231 | 0.237 |
| Properties (Cure: 145° C./60' | | |
| Unaged | | |
| M 100, $MP_a$ | 1.5 | 1.3 |
| M 200, $MP_a$ | 3.4 | 3.0 |
| M 300, $MP_a$ | 6.5 | 5.8 |
| TS, $MP_a$ | 21.2 | 20.5 |
| Elongation, % | 670 | 705 |
| Aged, 2d/100° C. | | |
| M 100, $MP_a$ | 2.5 | 2.1 |
| M 200, $MP_a$ | 6.1 | 4.8 |
| M 300, $MP_a$ | 10.4 | 8.4 |
| TS, $MP_a$ | 20.0 | 18.5 |
| Elongation, % | 520 | 560 |
| MS % (based on M 200) | 179 | 160 |

Table 8 shows the properties of Stock #2 to be consistent with the goals of the present invention, as compared to Stock #1, i.e. no inhibition of vulcanization and enhanced hardness stabilization. TBzTD appears to be a very effective acceleration agent achieving that goal, particuilarly when mixed with CDMPS as the stablizing agent.

What is claimed is:

1. A vulcanizable composition comprising a sulfur vulcanizable SBR rubber, a sulfur vulcanizing agent, an accelerating agent selected from the group consisting of sulfenamide accelerators, other than thiazole sulfenamides, and a hardness stabilization agent comprising a pyrimidine derivative of the formula:

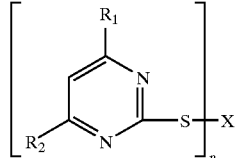

Where X=H, $R_1$ through $R_4$, $NR_3R_4$, $OR_5$, $SR_5$, $SO_2R_6$, M, $(SO_3)_zM$ (M=metal ion), and n and z can be the same or different and 1, 2 or 3, depending on whether the respective valence of X and M is 1, 2 or 3, $R_1$ through $R_4$ are the same or different and selected from the group consisting of the substituents H, halogen, OH, $NH_2$, alkyl, cycloalkyl, aryl, alkylaryl, aralkyl, with the substituents alkyl, cycloalkyl, aryl, alkylaryl and aralkyl optionally having additional functional groups selected from the group consisting of $NH_2$, OH, substituted amino, substituted hydroxyl, halogen, and carbonyl containing group, when $R_3$ and/or $R_4$ are one of the substituents alkyl, cycloalkyl, aryl, alkylaryl and aralkyl, they may be in the same constituent in a ring together with N to form a heterocyclic group, $R_5$ is selected from the group consisting of the substituents H, alkyl, cycloalkyl, aryl, alkylaryl and aralkyl, or a radical derived from a carbon based heterocyclic group containing at least one of S or N, or both S and N, $R_6$ is selected from the group consisting of the substituents alkyl, cycloalkyl, aryl, alkylaryl, aralkyl, H, OH, OM, $NH_2$, $NR_3R_4$, and $OR_5$, the amount of accelerating agent in said composition being greater than about 0.6 phr, and the amount of hardness stabilization agent being at least about 0.5 phr.

2. The composition of claim 1 wherein $R_5$ is a pyrmidine.

3. The composition of claim 1 wherein $R_5$ is 2-benzothiazoyl or pyrimidine.

4. The composition of claim 1 wherein the compound of formula I is 2,2' bis 4,6 dimethylpyrimidyl disulfide.

5. The composition of claim 1 wherein said sulfenamide accelerators, other than thiazole sulfenamides, are selected from the group consisting of benzothiazole-based accelerators, thiophosphoric acid derivatives, thiurams, dithiocarbamates, xanthates, and mixtures of one or more of these accelerators.

6. The composition of claim 1 wherein said sulfenamide accelerators, other than thiazole sulfenamides, are selected from the group consisting of mercaptobenzothiazoles, diphenylguanidine (DPG) and di-o-tolyl guanidine, and mixtures of one or more of these accelerators.

7. The composition of claim 1 wherein the amount of said sulfur vulcanizing agent provides in excess of about 1 parts per hundred of rubber in said composition.

8. The composition of claim 1 wherein the compound of formula I has the formula

9. The composition of claim 1 wherein the compound of formula I has the formula

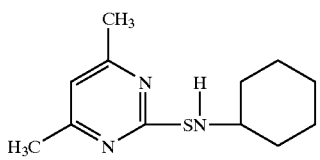

10. The composition of claim 1 wherein the compound of formula I has the formula

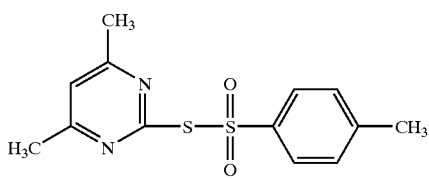

11. The composition of claim 1 wherein said accelerating agent comprises 2-mercaptobenzothiazole.

12. The composition of claim 1 wherein the amount of said compound of formula I is from at least about 0.5 phr to about 10.0 phr.

13. The composition of claim 1 wherein the amount of said compound of formula I is from at least about 0.5 phr to about 3.0 phr.

14. The composition of claim 1 comprising styrene-butadiene rubber, a 2-pyrimidinesulfenamide, and a mixture of the accelerators bis(dibenzylthiocarbamoyl) disulfide and 2-mercaptobenzothiazole.

15. The composition of claim 9 comprising styrene-butadiene rubber, and a mixture of the accelerators bis(dibenzylthiocarbamoyl) disulfide and 2-mercaptobenzothiazole.

16. The composition of claim 1 wherein said alkyl, cycloalkyl, aryl and aralkyl groups have from 2 to about 8 carbon atoms.

17. The composition of claim 1 wherein said accelerating agent comprises bis(dibenzylthiocarbamoyl)disulfide.

18. The composition of claim 1 comprising SBR rubber and greater than about 0.6 phr to about 10.0 phr of accelerating agent.

19. The composition of claim 1 comprising SBR rubber and greater than about 0.6 phr to about 3.0 phr of accelerating agent.

20. The composition of claim 1 wherein said hardness stabilization agent comprises N-cyclohexyl-4,6-dimethyl-2-pyrimidinesulfenamide and said accelerating agent comprises bis(dibenzylthiocarbamoyl) disulfide.

21. A method of improving the hardness stabilization of rubber by adding to unvulcanized sulfur vulcanizable SBR rubber a composition comprising a sulfur vulcanizing agent, an accelerating agent selected from the group consisting of sulfenamide accelerators, other than thiazole sulfenamides, and a hardness stabilization agent comprising a pyrimidine derivative of formula I of claim 1 the amount of accelerating agent in said composition being greater than about 0.6 phr and the amount of hardness stabilization agent being at least about 0.5 phr.

22. The composition of claim 1 wherein M is selected from the group consisting of Zn, Ni, Mg, Co and Na.

23. The composition of claim 1 wherein said corbonyl containing groups are carboxylic acid, or a salt, ester, amide, ketone or aldehyde of carboxylic acid.

24. The composition of claim 1 wherein said alkyl, cycloalkyl, aryl and aralkyl groups have from 2 to about 15 carbon atoms.

* * * * *